(12) United States Patent
Pausch

(10) Patent No.: US 7,845,678 B2
(45) Date of Patent: Dec. 7, 2010

(54) AIRBAG DEVICE

(75) Inventor: Tobias Pausch, Tokyo (JP)

(73) Assignee: Takata Corporation, Tokyo (JP)

( * ) Notice: Subject to any disclaimer, the term of this patent is extended or adjusted under 35 U.S.C. 154(b) by 159 days.

(21) Appl. No.: 12/320,689

(22) Filed: Feb. 2, 2009

(65) Prior Publication Data

US 2009/0309341 A1    Dec. 17, 2009

(30) Foreign Application Priority Data

Jun. 11, 2008    (JP)    ............... 2008-152892

(51) Int. Cl.
*B60R 21/01*    (2006.01)
*B60R 21/231*    (2006.01)
*B60R 21/239*    (2006.01)

(52) U.S. Cl. ............... 280/735; 280/739; 280/743.1; 280/743.2

(58) Field of Classification Search ............... 280/735, 280/739, 742, 743.1, 743.2
See application file for complete search history.

(56) References Cited

U.S. PATENT DOCUMENTS 5,762,367 A * 6/1998 Wolanin ............... 280/736
6,315,323 B1 * 11/2001 Pack, Jr. ............... 280/743.2
6,616,184 B2 * 9/2003 Fischer ............... 280/743.2
2003/0020266 A1   1/2003 Vendely et al.
2003/0127839 A1   7/2003 Jenkins
2004/0017069 A1 * 1/2004 Fischer ............... 280/739
2006/0290117 A1 * 12/2006 Fischer et al. ............... 280/739

FOREIGN PATENT DOCUMENTS

WO    WO 2004/009404 A2    1/2004

\* cited by examiner

*Primary Examiner*—Paul N Dickson
*Assistant Examiner*—Joseph Rocca
(74) *Attorney, Agent, or Firm*—Foley & Lardner LLP

(57) ABSTRACT

An airbag is inflated by gas for deployment to the front of and for restraining an occupant. A tether allows an inner capacity of the airbag to be equal to or smaller than a predetermined value by restricting a distance between a proximal end of the airbag and a surface of the airbag at deployment. A control unit acquires information relating to at least one of an occupant seat position, an occupant position to an instrument panel, an occupant physique, an occupant weight, and a magnitude of a collision impact. A release unit controls capacity and configuration of the airbag by releasing an end of the tether at a side of the proximal end according to the information acquired by the control unit. A vent discharges the gas before activation of the release unit and is closed on activation of the release unit.

11 Claims, 9 Drawing Sheets

VEHICLE FRONT SIDE

VEHICLE FRONT SIDE

VEHICLE FRONT SIDE

VEHICLE FRONT SIDE

AIRBAG DEVICE

BACKGROUND

The present disclosure relates to an airbag device installed in a vehicle such as an automobile, which deploys upon collision to restrain an occupant. More specifically, the present disclosure relates to an adaptive airbag device capable of controlling the size and inner pressure of the airbag after deployment according to the position and physique of the occupant and the impact resulting from the collision.

An airbag device may include an airbag that is deployed and inflated by high pressure gas upon collision of the automobile to restrain the occupant. The airbag device needs to appropriately restrain occupants each with different physique and weight. Generally, an airbag device includes a multi-stage inflator capable of performing stepwise adjustment of the gas output for changing the inflator output depending on the occupant's physique and the collision state. Alternatively, an airbag device may include a variable vent hole that can be opened and closed in response to a command from the control unit for controlling the inner pressure of the airbag at deployment.

SUMMARY

One embodiment of the disclosure relates to an airbag device. The airbag device includes an airbag having a restraining portion to restrain an occupant, a proximal end located apart from the restraining portion, and a suction port through which deployment gas is introduced. The airbag is inflated by the deployment gas for deployment to the front of the occupant. The airbag device also includes a gas supply unit for supplying the deployment gas to the suction port. The airbag device also includes a tether disposed outside the airbag and configured to allow an inner capacity of the airbag to be equal to or smaller than a predetermined value by restricting a distance between the proximal end and an outer surface of the airbag apart from the proximal end at deployment. The airbag device also includes a control unit configured to acquiring capacity set information data that relate to at least one of a seat position on which the occupant is seated, a position of the occupant with respect to an instrument panel, a physique of the occupant, a weight of the occupant, and a magnitude of an impact caused by the collision. The airbag device also includes a tether release unit for controlling the capacity of the airbag and adjusting a configuration of the airbag by releasing an end portion of the tether at a side of the proximal end according to the capacity set information acquired by the control unit. The airbag device also includes a vent that is opened to at least partially discharge the deployment gas from the airbag before activation of the tether release unit. The vent is closed with the activation of the tether release unit to control discharge of the deployment gas from the airbag.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
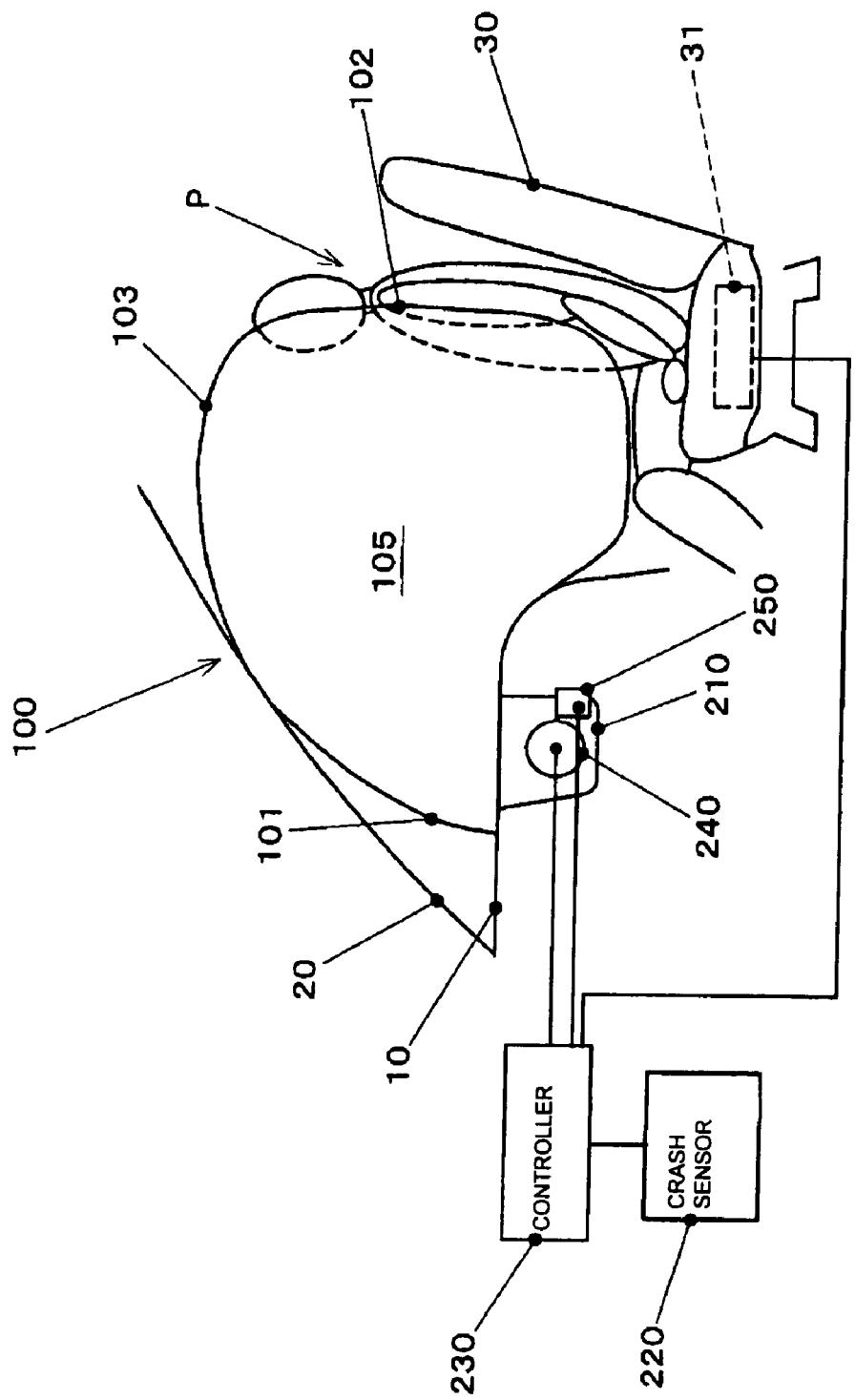
FIG. 1 is a side view showing a structure of an airbag device according to an exemplary embodiment.

According to one exemplary embodiment, an airbag device may have a structure as described in WO 2004/009404, which is herein incorporated by reference in its entirety. The airbag device includes a retainer driven by a solenoid that detachably retains one end of a thread while the other end of the thread is connected to a detachable patch for sealing a vent hole that can be opened and closed flexibly at deployment of the airbag.

According to another exemplary embodiment, the airbag device may have a structure as described in US 2003/0020266, which is herein incorporated by reference in its entirety. The airbag device may open the vent hole by releasing the end of the detachable patch member provided in the vent hole using an explosive actuator according to a detection result with respect to the physique of the occupant detected by an optical sensor.

According to another exemplary embodiment, the airbag device may have a structure as described in US 2003/0127839, which is herein incorporated by reference in its entirety. The airbag includes a tether for restricting a capacity of the airbag at deployment and a variable vent that releases the tether for an occupant with large physique to increase the airbag capacity. The variable vent may be closed or sealed with the release of the tether making the airbag capacity variable at deployment to control the inner pressure without using a multi-stage inflator.

It has conventionally been difficult to design an airbag device that allows occupants with different physiques and seating positions to be appropriately restrained by merely changing the inner pressure of the airbag. Further, it may be preferable to make the capacity and the pressure of the airbag controllable.

Use of a tether inside the airbag for restricting the capacity of the airbag may make it difficult to arrange and handle the tether for stitching when manufacturing the airbag. In order to release the tether, a release member may be installed inside the retainer where the airbag is stored in the folded state before deployment. The release member may be stored in a generally small space, which may restrict the degrees of freedom in designing and make the assembly more complicated.

According to other exemplary embodiments, an airbag device may be capable of appropriately restraining various types of occupants at different positions, with different physiques and weights, and under different collision impacts while being relatively easy to manufacture.

According to an exemplary embodiment, the airbag device may include an airbag having a restraining portion to restrain an occupant and a proximal end that is located apart from the restraining portion. The airbag may include a suction port through which deployment gas is introduced and is inflated by the deployment gas at deployment to the front of the occupant. The airbag device may also include a gas supply unit for supplying the deployment gas to the suction port. The airbag device may also include a tether (e.g., a capacity restricting tether) disposed outside the airbag to allow an inner capacity of the airbag at deployment to be equal to or smaller than a predetermined value by restricting a distance between the proximal end and an outer surface apart from the proximal end upon the deployment. The airbag device may also include a control unit (e.g., a capacity set information acquiring unit) for acquiring capacity set information data that relates to at least one of a seat position on which the occupant is seated, a position of the occupant with respect to an instrument panel, the occupant's physique, the occupant's weight, and a magnitude of the impact caused by the collision. The airbag device may also include a tether release unit for controlling the capacity of the airbag and adjusting a configuration of the airbag by releasing an end portion of the tether at a side of the proximal end according to the capacity set information. The airbag device may also include a vent (e.g., a variable vent member) that is opened to at least partially discharge the deployment gas from the airbag before activation of the tether release unit and that is closed or sealed with the activation of the tether release unit to control discharge of the deployment gas from the airbag.

According to some exemplary embodiments, the tether release unit may include a member that displaces or deforms an engagement member, such as a hook engaging with the end of the tether, to disengage with the tether. The displacement or the deformation of the engagement member may be performed by an actuator equipped with the gas generator or an electric actuator such as a solenoid.

According to an exemplary embodiment, the control unit may include a load sensor disposed in a vehicle seat for detecting the load exerted to the seat surface. The control unit may also include a seat position sensor for detecting the position of the seat (e.g., position in a longitudinal direction). The control unit may also include a member for detecting the physique of the occupant and the occupant position with respect to an interior member (e.g., an instrument panel) through image processing based on an image picked up by an imaging device, such as a camera. The magnitude of the impact resulting from the collision may be detected by an acceleration sensor mounted, for example, on the vehicle body.

According to various exemplary embodiments, when the physique of the occupant is relatively large or the magnitude of the impact resulting from the collision is relatively high (e.g., high impact energy, high acceleration, high initial speed of the vehicle, etc.), the tether may be released by the tether release unit. As a result, the capacity of the airbag can be increased to an enlarged configuration to increase the distance from the proximal end to the restraint portion. The vent is closed or sealed in association with the releasing operation of the tether release unit to suppress discharge of the deployment gas from the airbag to the outside. This suppression makes it possible to maintain an appropriate inner pressure irrespective of the increased airbag capacity.

According to various exemplary embodiments, when the physique of the occupant is relatively small or the magnitude of the impact resulting from the collision is relatively low, the tether is enabled without operating the tether release unit to keep the airbag capacity small. The deployment gas can be discharged from the vent to prevent the inner pressure from becoming excessively high, even when the airbag capacity is small.

Because the tether is disposed outside of the airbag, the arrangement or fixation of the tether during manufacturing of the airbag can be simplified. The airbag device may be capable of performing appropriate restraint according to the physique of the individual occupant and the magnitude of the impact resulting from the collision as well as simplifying the manufacturing.

The vent may be opened and closed in association with the operation of the release unit. Accordingly, the airbag capacity and the vent hole operation may not have to be individually controlled, resulting in simplified control operation. The inner pressure of the airbag may be controlled according to a change in the airbag capacity without using a more costly multi-stage inflator.

According to some exemplary embodiments, the vent may include a vent hole formed in a surface of the airbag and a cover panel having an opening formed around the vent hole. The cover panel is disposed in a region along an inner surface or an outer surface of the airbag to cover the vent hole. A vent sealing tether may be connected to the cover panel and be pulled upon activation of the tether release unit. Before activating the tether release unit, the cover panel may be fixed to a region of the airbag opposite the vent sealing tether and may be bent by a breakable member. The opening may be located at a position overlapped with the vent hole and be open. After activating the tether release unit, the breakable member is broken by inflation of the airbag to extend the bent portion and the opening is displaced from the vent hole and is closed.

Because the vent hole of the vent may be closed with the release of the tether, an actuator that is individually provided for opening and closing the vent may be eliminated to simplify the structure of the airbag device.

The cover panel may be connected to an inner side surface of the airbag and the tether may be connected to an outer side surface of the airbag. Before activating the tether release unit, the tether pulls the outer side surface of the airbag to bring the vent hole of the airbag and the opening of the cover panel into a substantially same position to discharge a large amount of the deployment gas and reduce the capacity and the configuration of the airbag. The cover panel may be integrally formed with the vent sealing tether, making it possible to simplify the airbag structure by reducing the number of the components.

After activating the tether release unit, the tether may be released at deployment of the airbag so a main panel of the airbag can be largely inflated. The cover panel may have one end fixed to the main panel of the airbag and the other end connected to the vent sealing tether. An end portion of the vent sealing tether opposite the cover panel may be fixed to a fixing member for fixing the airbag to a vehicle body to keep the cover panel at a constant distance from the fixing member regardless of movement of the tether.

As the main panel of the airbag pulls the cover panel and the vent sealing tether to break the breakable member, the cover panel may be located at substantially the same position in regardless of movement of the main panel. Therefore, the cover panel can be moved relative to the main panel to increase the likelihood of closing or sealing the vent.

After activating the tether release unit, a distance between a bottom surface of a retainer for fixing the airbag to the vehicle body and the vent hole of the airbag may be greater than a distance between the bottom surface and the opening of the cover panel. As the position of the cover panel opening is displaced with respect to the position of the vent hole of the airbag, the vent may be securely closed or sealed.

According to an exemplary embodiment, the vent may include a vent hole formed in a surface of the airbag and a cover panel disposed in a region along an outer surface of the airbag to cover the vent hole. The vent may have an opening around the vent hole to which the tether is connected. Before activating the tether release unit, the cover panel may hold a region of the vent hole in the outer surface of the airbag opposite the proximal end in a bent state with a breakable member. The cover panel may be located at a position having the opening overlapped with the vent hole to be opened. After activation of the tether release unit, the breakable member may be broken under a tensional force exerted on the airbag to extend the bent portion to displace the opening from the vent hole and to close the vent hole.

Because the elements that constitute the vent are disposed outside the airbag, in addition to the advantageous described above, handling of the respective members during manufacture of the airbag may be simplified.

Before activation of the tether release unit, the opening formed in the cover panel and the vent hole of the airbag may be located at a substantially same position so as to be held by the breakable member. The breakable member may be broken with the operation of the tether release unit to displace the opening of the cover panel from the airbag vent hole to be closed or sealed. After activating the tether release unit, a distance between a fixing member for fixing the airbag to a vehicle body and the opening of the cover panel may be greater than a distance between the fixing member and the vent hole of the airbag. The opening of the cover panel and the vent hole position of the airbag may be displaced to increase the likelihood that the vent is closed or sealed.

According to an exemplary embodiment, the airbag device may include a plurality of tethers. At least one of the plurality of the tethers may be disposed from an outer lower side surface of the airbag to the tether release unit after deployment to pull the outer side surface of the airbag to change a configuration of the airbag by restricting the airbag capacity. This restriction may make it possible to appropriately control the configuration of the lower portion of the airbag.

According to an exemplary embodiment, a retainer may store or retain the airbag in a folded state before deployment while the tether release unit may be disposed outside of the airbag. The tether release unit is disposed outside the airbag rather than inside the airbag with limited space to improve the degree of the design freedom of the tether release unit and to further simplify manufacturing of the airbag device.

As described above, the present disclosure provides an airbag device having a tether disposed outside the airbag for restricting the airbag capacity and a vent that can be closed or sealed in with the release of the tether to appropriately restrain an occupant regardless of differences in the position and physique of the occupant and the magnitude of the impact while simplifying the manufacturing process.

A first exemplary embodiment of the airbag device will be described referring to FIGS. 1 to 5. In the description, the longitudinal, vertical and lateral directions correspond to the longitudinal, vertical, and the lateral (vehicle width) directions of the vehicle having the airbag device.

FIG. 1 is a schematic side view showing a general structure of the airbag device according to the first exemplary embodiment. The airbag device may be used for the front passenger seat of an automobile, for example a top mount airbag device for mounting on an upper portion of an instrument panel 10. The airbag device includes an airbag 100, a retainer 210, a crash sensor 220, a controller 230, an inflator 240, and a tether release unit 250.

The airbag or main body 100 may be formed by sewing plural panels each cut from a base cloth formed of nylon and polyester material and may be structured to deploy to the rear of the vehicle from the portion between the instrument panel 10 and a front screen 20 upon a vehicle collision to restrain the head, shoulder and chest of an occupant P seated on the front passenger seat 30.

The front passenger seat 30 is provided with a seat sensor or control unit 31 for detecting the load exerted by the weight of the occupant P. The output of the seat sensor 31 is input to the controller 230. The selection between a capacity restricted state and capacity restriction release state of the airbag 100 may be made according to the output of the seat sensor or control unit 31.

The retainer 210 is a receptacle for storing the airbag 100 in a folded state before deployment. The inflator 240 may be fixed to the retainer 210. The retainer 210 is disposed at a lower side of an upper surface inside the instrument panel 10 and functions as a fixing member to fix the airbag 100 to the vehicle body with a bag ring 212.

The crash sensor 220 includes an acceleration pickup for detecting an impact generated by a collision of the vehicle and sends an output indicative of the impact to the controller 230. The controller 230 determines if the airbag 100 should be deployed based on the output of the crash sensor 220. If it is determined that deployment is necessary, a deployment signal is supplied to the inflator 240. The controller 230 determines whether or not the operation of the tether release unit 250 is necessary based on the input from the seat sensor 31. If it is determined that the operation is necessary, the release signal is generated to activate the tether release unit 250.

The inflator 240 is a gas generator for generating gas for deploying the airbag 100 because of a vehicle collision. The inflator 240 may include a gas-forming agent for generating nitrogen gas upon combustion and an igniter for igniting the gas-forming agent via an ignition agent.

The tether release unit 250 is connected to each end portion of front and rear tethers (e.g., capacity restricting tethers) 110 and 120 attached to the airbag 100. The tether release unit 250 releases the tether in response to a release signal sent from the controller 230 at deployment of the airbag 100.

The state of the airbag 100 may be selected from a capacity restricted state (initial state) and a capacity restriction release state at deployment according to the physique of the occupant. The capacity restricted state is selected when the physique of the occupant P is relatively small while the capacity restriction release state is selected when the physique of the occupant P is relatively large. The selection is made by comparing the load detected by the seat sensor 31 with a predetermined threshold value.

Figure 2:
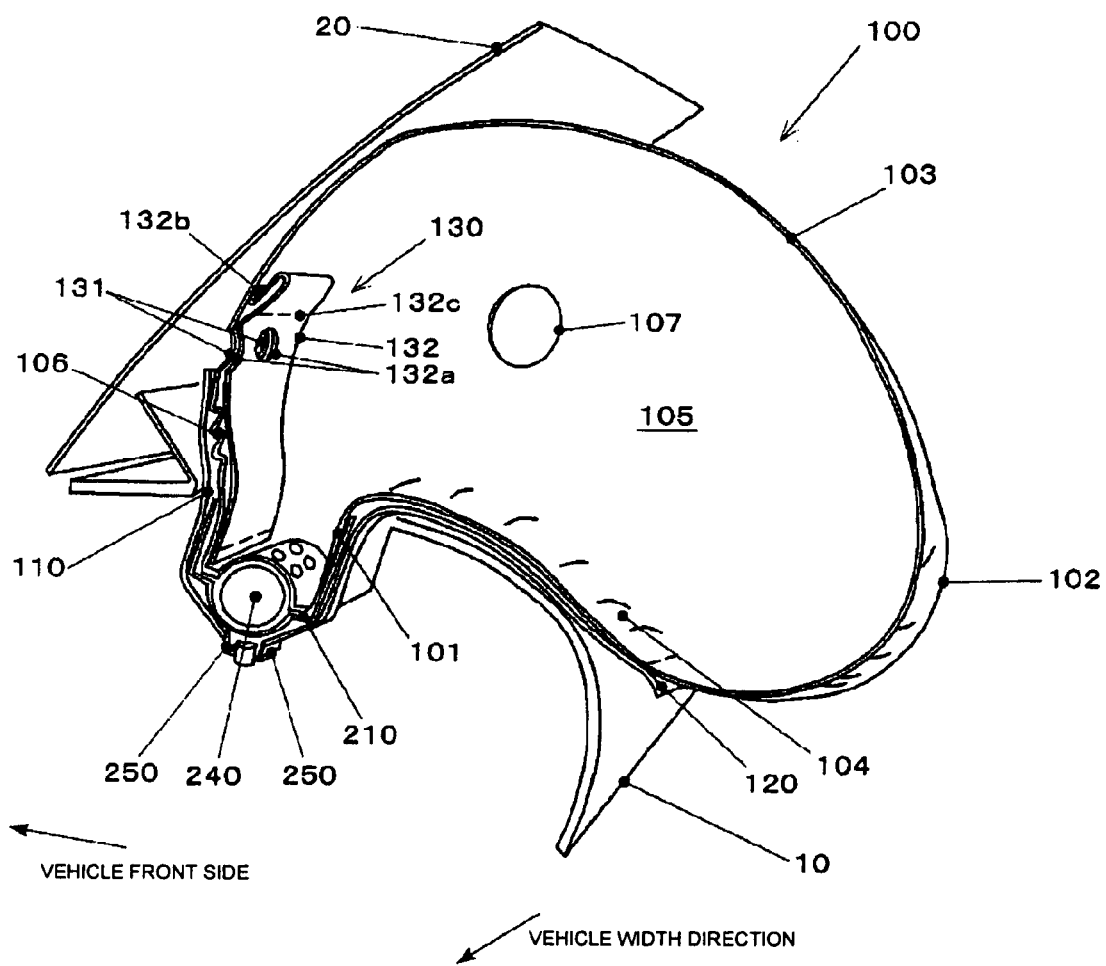
FIG. 2 is a perspective side view showing the airbag device in a capacity restricted state according to an exemplary embodiment.

FIG. 2 is a perspective sectional view showing the airbag device in the capacity restricted state when viewed from an obliquely rear upward direction according to an exemplary embodiment. The cross-section is a plane that orthogonally crosses the vehicle width direction (the same applies to FIGS. 4, 6 and 7 to be described later).

According to various exemplary embodiments, the airbag 100 has a laterally symmetrical structure unless otherwise specified. The airbag 100 generally includes a proximal end 101, a restraint portion 102, an upper surface 103, a lower surface 104, a side surface 105, and a front surface 106.

The proximal end 101 is a portion where the airbag 100 is retained by the retainer 210. The proximal end 101 is attached to or is integrally formed as an end portion of the airbag 100 at the vehicle front side and includes a suction port for admitting the deployment gas generated by the inflator 240 at deployment of the airbag 100.

The restraint portion 102 is a plane portion that allows the airbag 100 to restrain the head and chest of the occupant. The restraint portion 102 is disposed at the deployed airbag 100 to the rear of the vehicle to face the occupant P.

The upper surface 103 extends from the upper portion of the front surface 106 to the upper portion of the restraint portion 102. The lower surface 104 extends from the rear portion of the suction port of the proximal end 101 to the lower portion of the restraint portion 102.

The side surface 105 is formed at left and right sides of the airbag 100. The outer circumferential portion of the side surface 105 is connected to each side end of the proximal end 101, the restraint portion 102, the upper surface 103, and the lower surface 104.

The front surface 106 extending from the front portion of the proximal end 101 to the front end of the upper surface 103 faces the front side of the vehicle opposite the inner surface of the front screen 20.

The side surface 105 includes a vent hole 107 through which the deployment gas is discharged outside from the airbag 100 at deployment. The vent hole 107 may be a circular opening, for example. The vent hole 107 is disposed separately from the vent 130 to be described later and is opened irrespective of the airbag states, that is, the capacity restricted state and the capacity restriction release state.

The airbag 100 is typically formed by sewing two upper and lower base cloth panels together. An upper base cloth panel may constitute the whole portion of the upper surface 103 having the outer circumferential edge folded downward to form each upper surface of the proximal end 101, the restraint portion 102, the side surface 105 and the front surface 106.

A lower base cloth panel may constitutes the whole portion of the lower surface 104 having the outer circumferential edge folded upward to form each lower surface of the proximal end 101, the restraint portion 102, the side surface 105, and the front surface 106. The respective outer circumferential edges of the upper and the lower base cloth panels may be sewn together to form the airbag 100 into a bag-like structure.

The airbag 100 includes a front tether 110, and a rear tether 120, each serving as a capacity restricting member, and the vent (e.g., a variable vent member) 130. Each of the front and the rear tethers 110 and 120 is formed into a belt-like structure using the base cloth panel.

The front tether 110 has one end fixed to the front surface 106 of the airbag 100, for example by sewing. The other end of the front tether 110 is connected to the tether release unit 250 and is released upon activation of the tether release unit 250. In the capacity restricted state, the front tether 110 maintains the region defined by the portion of the front surface 106 of the deployed airbag 100 that is connected to the front tether 110 and maintains the proximal end 101 in a bent or loose state. The distance between the connected portion and the proximal end 101 is shorter than the distance in the capacity restriction release state where the front tether 110 is released.

The rear tether 120 has one end fixed to the lower surface 104 of the airbag 100, for example by sewing. The other end of the rear tether 120 is connected to the tether release unit 250 and is released upon activation of the tether release unit 250. In the capacity restricted state, the rear tether 120 maintains the region defined by the portion of the lower surface 104 of the deployed airbag 100 that is connected to the rear tether 120 and maintains the proximal end 101 in the bent or loose state. The distance between the connected portion and the proximal end 101 is shorter than the distance in the capacity restriction release state where the rear tether 120 is released.

In the capacity restricted state, the front and rear tethers 110 and 120 allow the airbag 100 to have a smaller capacity than when in the capacity restriction release state and reduces the distance between the restraint portion 102 and the proximal end 101 to be in the preferable state for restraining an occupant P with a small physique.

The vent 130 is opened when the airbag 100 is in the capacity restricted state to at least partially release the deployment gas to an outside environment and is closed or sealed in the capacity restriction release state to appropriately adjust the inner pressure of the airbag 100 in the respective states. The vent 130 may extend over the region of the airbag 100 from the proximal end 101 to the front surface 106.

Figure 3:
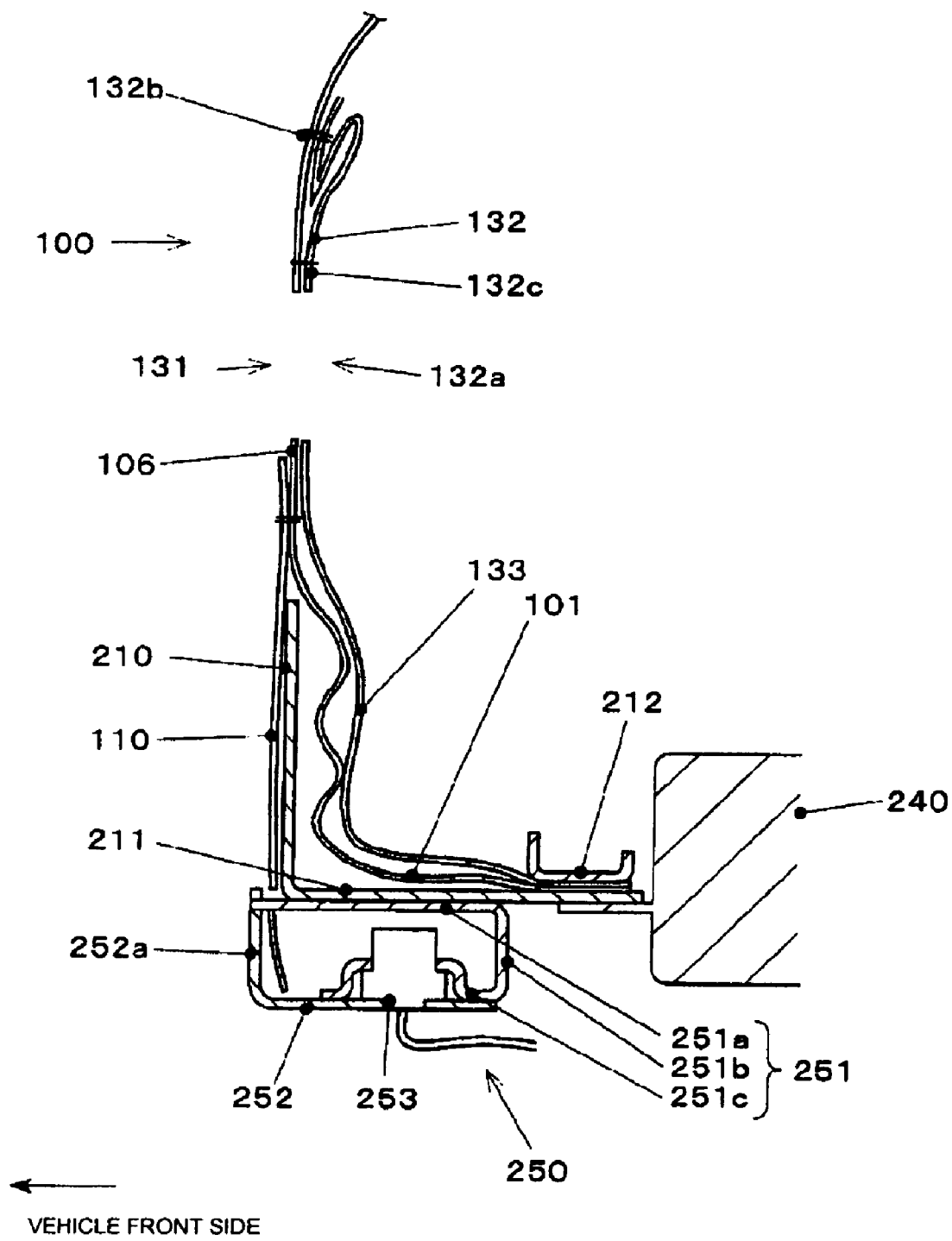
FIG. 3 is an enlarged sectional view showing a portion around a vent in the capacity restricted state according to an exemplary embodiment.

FIG. 3 is an enlarged sectional view showing the portion around the vent in the capacity restricted state when viewed from the vehicle width direction (the same applies to FIG. 5) according to an exemplary embodiment. The vent 130 includes a vent hole 131, a cover panel 132, and a vent sealing tether 133. The cover panel 132 and the vent sealing tether 133 may be integrally formed from the same base cloth panel.

The vent hole 131 is a generally circular opening formed in the front surface 106 of the airbag 100. The vent hole 131 is disposed at the upper side of the front surface 106 to be connected to the front tether 110.

The cover panel 132 is formed from the base cloth panel into a vertically extending rectangular panel, for example, and disposed opposite the inner surface of the front surface 106 inside the airbag 100. The cover panel 132 has its portion corresponding to the airbag 100 in the front surface view located at the position for covering the vent hole 131.

Referring to FIGS. 2 and 3, the cover panel 132 includes an opening 132a as a generally circular opening with a size substantially the same as that of the vent hole 131. Plural vent holes 131 and the openings 132a are formed at locations apart from one another, for example in a width direction of the airbag 100.

The upper end portion of the cover panel 132 may be joined with the front surface 106 of the airbag 100 with a stitch portion 132b. In the capacity restricted state, the cover panel 132 may be joined at the intermediate portion between the stitch portion 132b and the opening 132a using a tear seam (breakable member) 132c.

The tear seam 132c keeps the opening 132a formed in the cover panel 132 and the vent hole 131 located at substantially the same position in the capacity restricted state. The joint strength of the tear seam 132c with respect to the front surface 106 may be lower than the strength of the stitch portion 132b by reducing the number of threads for stitching or by lowering the strength. As a result, the tear seam 132c is broken under the tensional force of the vent sealing tether 133 in the capacity restriction release state.

The region of the cover panel 132 between the stitch portion 132b and the tear seam 132c is bent as shown in FIG. 3 and brought into the loose state with respect to the front surface 106 of the airbag 100.

The vent sealing tether 133 has one end portion connected to the lower end portion (end portion at the side of the proximal end 101) and the other end of the vent sealing tether 133 is fixed to the retainer 210 at the proximal end 101 of the airbag 100.

The vent sealing tether 133 may keep the distance between the opening 132a of the cover panel 131 and the retainer 210 substantially constant irrespective of each state of the front and the rear tethers 110 and 120.

Referring to FIG. 3, the retainer 210 includes a bag ring 212 at the upper side of the bottom surface 211. The bag ring 212 as the annular plate is used for fixing the proximal end 101 of the airbag 100 to the retainer 210. The inflator 240 is inserted into the center opening of the bag ring 212.

The end portion of the vent sealing tether 133 is interposed between the bottom surface 211 of the retainer 210 and the bag ring 212 with the base cloth panel to form the proximal end 101 of the airbag 100.

The tether release units 250 are disposed to the front and the rear of the retainer 210 corresponding to the front and the rear tethers 110 and 120, respectively. The tether release unit 250 at the front side (corresponding to the front tether 110) will be described in this example. The tether release unit 250 at the rear side (corresponding to the rear tether 120) has substantially the same structure.

The tether release unit 250 includes a base plate 251, a hook plate 252, and an actuator 253. The base plate 251 is a base portion of the tether release unit 250 and is disposed on a lower surface of the bottom surface 211 of the retainer 210. The base plate 251 may have a generally U-like shape from a side view. The base plate 251 may be formed by integrating an upper surface 251a fixed to the outer circumference of the bottom surface 211 of the retainer 210, a side surface 251b that protrudes downward from the end portion of the upper surface 251a at the side of the inflator 240, and a lower surface 251c that protrudes from the lower end portion of the side surface 251b to the side opposite the inflator 240.

The hook plate 252 may be formed by bending a strip-shaped metal plate. The hook plate 252 is fixed to the lower surface 251c of the base plate 251. The hook 252a is bent upward to stand and is formed at the end portion of the hook plate 252 at the open end side of the U-like shaped base plate 251. The upper end portion of the hook 252a abuts on the end portion of the upper surface 251a of the base plate 251. In the capacity restricted state (tether release unit 250 is inactive), the end portion of the front tether 110 at the side of the proximal end 101 is engaged with the hook 252a.

The actuator 253 may be of an explosive type and disposed opposite the hook 252a of the hook plate 252. Upon activation, the actuator 253 deforms the hook 252a under the pressure of the injecting gas to move away from the upper surface 251a of the base plate 251 and disengage or release the end portion of the front tether 110 from the hook 252a. The tether release unit 250 is engaged with the rear tether 120 before activation and releases the rear tether 120 upon the activation.

Figure 4:
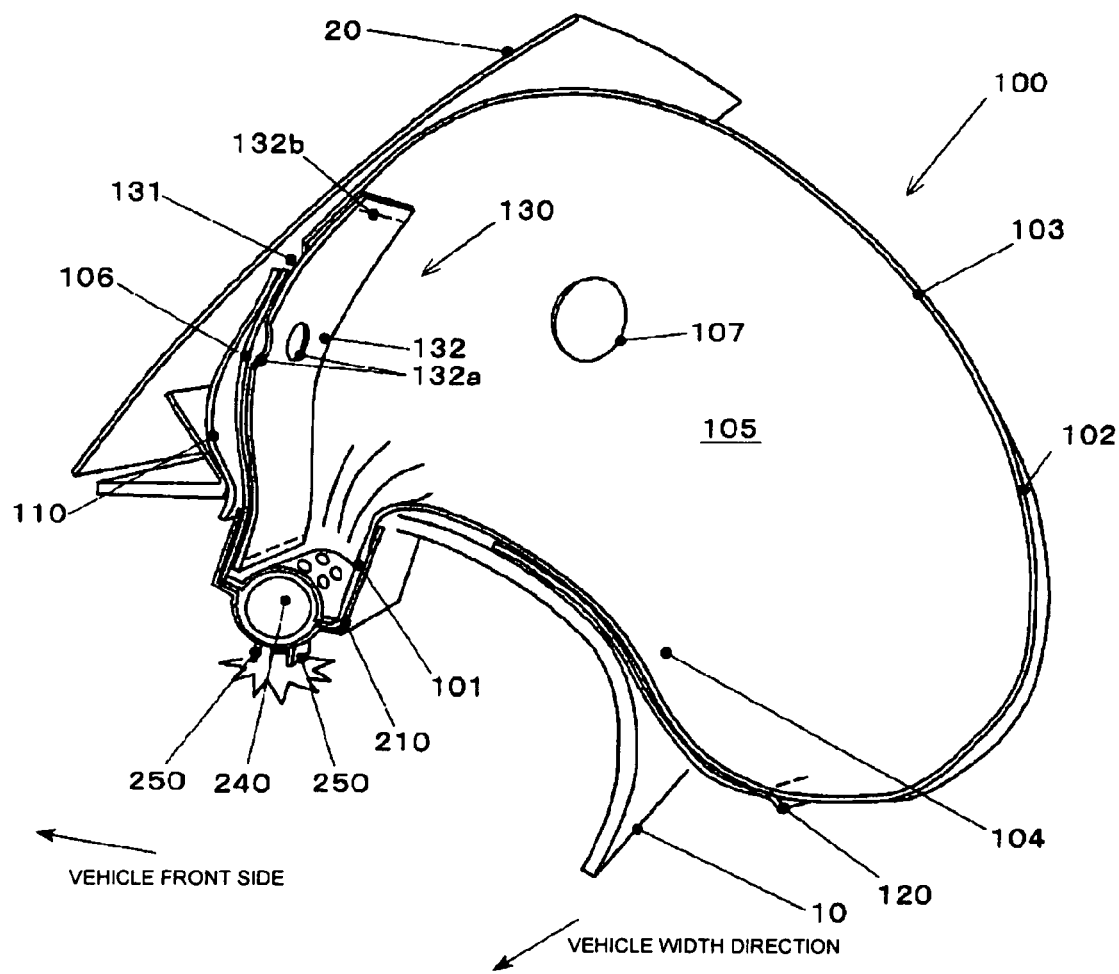
FIG. 4 is a perspective sectional view showing the airbag device in the capacity restriction release state according to an exemplary embodiment.
Figure 5:
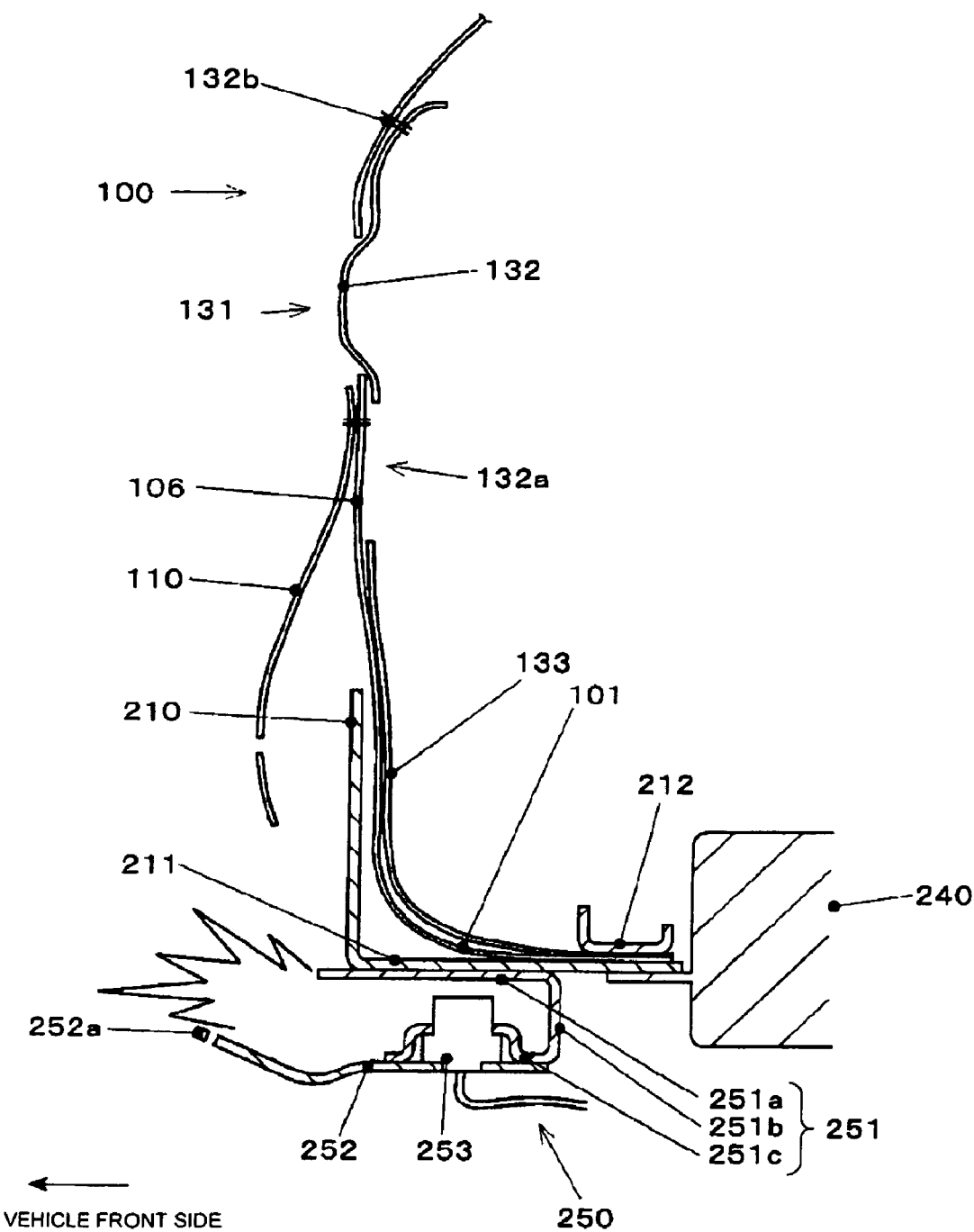
FIG. 5 is an enlarged sectional view showing the portion around the vent in the capacity restriction release state according to an exemplary embodiment.

FIG. 4 is a sectional view showing the airbag device in the capacity restriction release state according to an exemplary embodiment. FIG. 5 is an enlarged sectional view showing the portion around the vent in the capacity restriction release state according to an exemplary embodiment.

When the tether release unit 250 releases end portions of the front and the rear tethers 110 and 120 at the side of the proximal end 101, the restraint portion 102 of the airbag 100 retracts to the rear of the vehicle (side of the occupant P) prior to the release state to increase the capacity of the airbag 100.

When the front and the rear tethers 110 and 120 are released to extend the bent portion of the front surface 106 of the airbag 100, the vent sealing tether 133 of the vent 130 pulls the cover panel 132. The resulting tensional force breaks the tear seam 132c, which joins the cover panel 132 with the front surface 106.

When the tear seam 132c breaks, the bent region of the cover panel 132 between the stitch portion 132b and the tear seam 132c extends. As a result, the opening 132a of the cover panel 132 displaces relative to the vent hole 131 of the front surface 106 to the proximal end 101. That is, the distance between the retainer 210 and the bag ring 212 and the opening 132a of the cover panel 132 becomes longer than the distance between the retainer 210 and the bag ring 212 and the opening 132a of the cover panel 132. The cover panel 132 is pressed toward the front surface 106 under the pressure of the deployment gas in the airbag 100 to close or seal the vent hole 131. When the vent hole 131 is closed, the deployment gas in the airbag 100 is mainly discharged from the vent hole 107 of the side surface 105.

The operation of the airbag device according to the first exemplary embodiment at a collision of the vehicle will now be described. In the normal operation state of the vehicle (before collision), the airbag 100 is folded inside the retainer 210 and stored in the instrument panel 10.

When a frontal collision occurs, the crash sensor 220 detects the acceleration generated by the collision. When the controller 230 determines that the airbag 100 should be deployed based on the output of the crash sensor 220, the controller 230 outputs a deployment signal to the inflator 240. The inflator 240 generates gas according to the deployment signal. The gas is introduced into the airbag 100 via the suction port of the proximal end 101 and the airbag 100 then starts deploying and inflating under the pressure.

The controller 230 determines whether or not the tether release unit 250 is activated based on the signal representing the physique of the occupant P received from the seat sensor 31. For example, if the load detected by the seat sensor 31 is larger than a predetermined threshold value, the controller 230 determines that the physique of the occupant P is large. Then the tether release unit 250 is activated to deploy and inflate the airbag 100 in the capacity restriction release state. If the load is equal to or smaller than the threshold value, the controller 230 determines that the physique of the occupant P is small. Then the tether release unit 250 is not activated to deploy and inflate the airbag 100 in the capacity restricted state.

According to the first embodiment, when the physique of the occupant P is relatively large and the load detected by the seat sensor 31 is large, the tether release unit 250 releases the front and the rear tethers 110 and 120 to increase the capacity of the airbag 100 so the restraint portion 102 retracts in the direction away from the proximal end 101. An occupant P with a large physique and at a seating position at a rear side may be restrained in the capacity restriction release state.

As the vent sealing tether 133 is released, the cover panel 131 of the vent 130 is pressed to the inner surface of the airbag 100 under the pressure of the deployment gas in the airbag 100 to close or seal the vent hole 107. This makes it possible to suppress discharge of the deployment gas from the inside the airbag 100 to the outside. The appropriate inner pressure to restrain an occupant P with a large physique may be maintained irrespective of the increased capacity of the airbag 100.

When the physique of the occupant P is relatively small and the load detected by the seat sensor 31 is small, the front and the rear tethers 110 and 120 are enabled without activating the tether release unit 250. This makes it possible to keep the capacity of the airbag 100 small and appropriately restrain an occupant P with a relatively small physique at substantially the front seating position.

As the vent sealing tether 133 is kept under the tensional force, the cover panel 131 is pulled to cause the deployment gas in the airbag 100 to be discharged from the vent holes 106 and 107. In spite of small capacity of the airbag 100, the excessive increase in the inner pressure may be prevented to appropriately restraining the occupant P.

According to various exemplary embodiments, both the capacity and the inner pressure of the airbag may be simultaneously controlled using a single release unit. This single unit makes it possible to simplify the structure of the airbag device. The inner pressure of the airbag may be controlled according to the change in the airbag capacity without using a costly multi-stage inflator.

Because the front and the rear tethers 110 and 120 are disposed outside the airbag 100, the front and rear tethers 110 and 120 may be easily handled during manufacturing of the airbag 100 and thus the airbag 100 may be more easily manufactured. Because the tether release unit 250 is disposed outside the narrow retainer 210 rather than inside, the degree of freedom in designing the tether release unit 250 may be increased. The vent 130 may not require cables and tethers to be drawn from the inside to the outside the airbag 100, thus further simplifying the structure of the airbag 100.

A second exemplary embodiment of the airbag device is similar to the first exemplary embodiment described above. The components that substantially correspond to those of the first exemplary embodiment will be designated with the same reference numerals and explanations thereof will be omitted. Only different features will be described.

Figure 6:
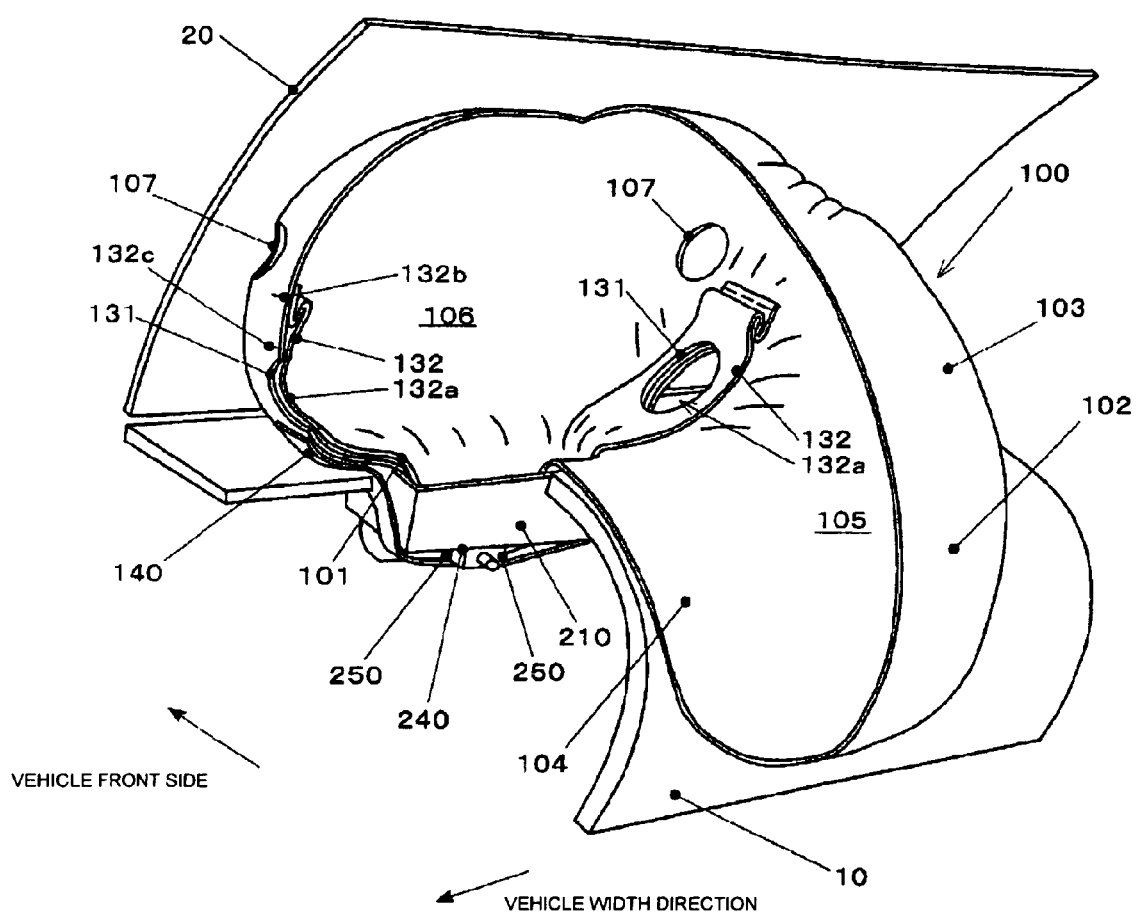
FIG. 6 is a perspective sectional view showing the airbag device in the capacity restricted state according to an exemplary embodiment.
Figure 7:
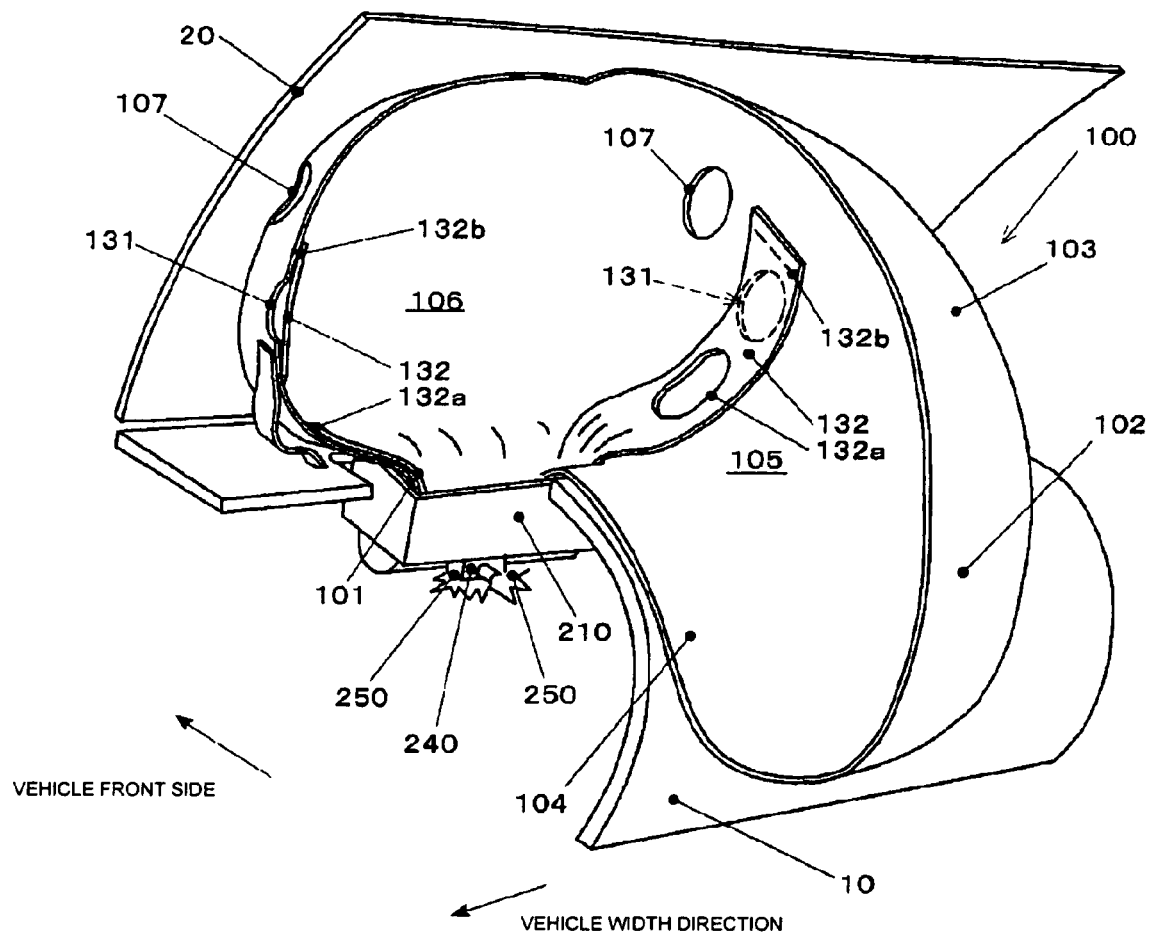
FIG. 7 is a perspective sectional view showing the airbag device in the capacity restriction release state according to an exemplary embodiment.

FIG. 6 is a perspective sectional view showing the airbag device in the capacity restricted state according to an exemplary embodiment. FIG. 7 is a perspective sectional view showing the airbag device in the capacity restriction release state according to an exemplary embodiment.

The second exemplary embodiment of the airbag device includes a lateral tether (e.g., a capacity restricting tether) 140 instead of the front and the rear tethers 110 and 120 and includes the vent 130 in a region adjacent to the lateral tether 140 from the proximal end 101 to the side surface 105.

The lateral tether 140 may have a belt-like shape formed by the base cloth panel. The lateral tether 140 has one end fixed to the side surface 105 of the airbag 100, for example through sewing. The other end of the lateral tether 140 is connected to the tether release unit 250 and is released upon activation of the tether release unit 250.

The lateral tether 140 in the capacity restricted state holds the region between the portion of the side surface 105 of the deployed airbag 100, which is connected to the lateral tether 140 and the proximal end 101 in the bent (loose) state. The distance between the connected portion and the proximal end 101 is shorter than the distance in the capacity restriction release state where the lateral tether 140 is released.

Like the front and the rear tethers 110 and 120 according to the first exemplary embodiment, the lateral tether 140 is released by the tether release unit 250 in the capacity restriction release state. Accordingly, the capacity of the airbag 100 is increased to close or seal the vent hole 131 of the vent 130. The second exemplary embodiment described above provides the similar advantages to those of the first exemplary embodiment.

A third exemplary embodiment of the airbag device is similar to the airbag device of the first and second exemplary embodiments. The airbag device according to the third exemplary embodiment includes a vent (e.g., a variable vent member) 150 instead of the vent 130 described in the first exemplary embodiment.

Figure 8:
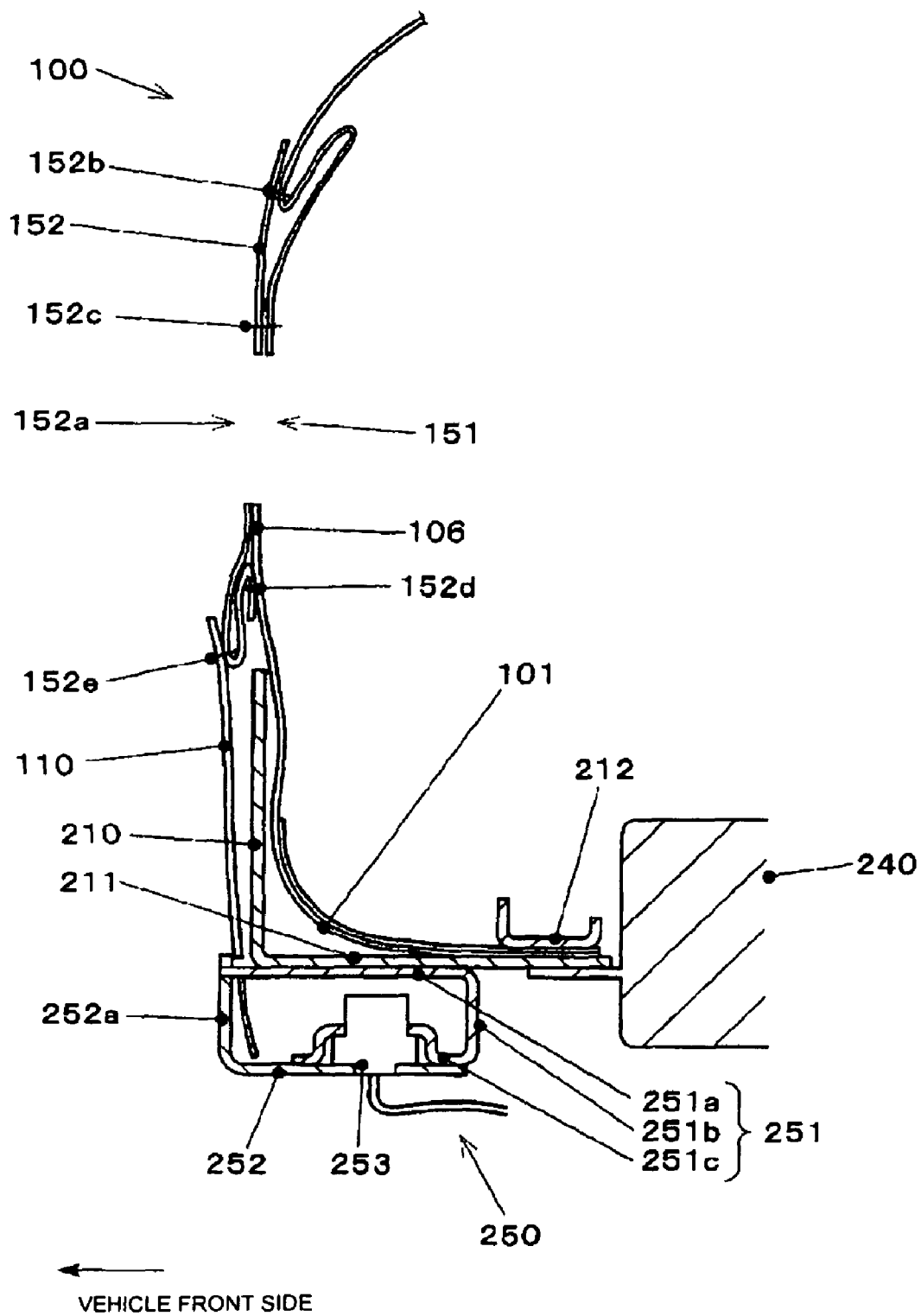
FIG. 8 is an enlarged sectional view s showing the portion around the vent of the airbag device in the capacity restricted state according to an exemplary embodiment.

FIG. 8 is a sectional view showing the portion around the vent 150 in the capacity restricted state according to an exemplary embodiment. The vent 150 includes a vent hole 151 and a cover panel 152. Like the vent hole 131 described in the first exemplary embodiment, the vent hole 151 is a generally circular opening formed in the front surface 106 of the airbag 100.

A cover panel 152 is formed into the vertically extending rectangular panel using the base cloth panel and disposed outside the airbag 100 so as to be opposite the front surface 106. The cover panel 152 is disposed such that the airbag 100 at the position in the front view covers the vent hole 151.

The cover panel 152 includes an opening 152a that is a generally circular opening with the size substantially the same as that of the vent hole 151. The cover panel 152 is joined with the front surface 106 of the airbag 100 at a stitch portion 152b, a tear seam 153c, and/or a stitch portion 152d. The stitch portion 152b is disposed at the upper end portion (end portion at the side opposite the proximal end 101) of the cover panel 152.

The tear seam 152c is formed adjacent to the upper end of the opening 152a so it can be broken under a tensional force generated on the front surface 106 with the release of the front tether 110 by the tether release unit 250 upon inflation of the airbag 100.

Referring to FIG. 8, the region between the stitch portion 152b and the tear seam 152c on the front surface 106 is in the bent or loose state. The stitch portion 152d is disposed at the lower end (end portion at the side of the proximal end 101) of the cover panel 152.

In the third exemplary embodiment, the end of the front tether 110 at the side of the front surface 106 is not directly joined with the front surface 106, but joined with the cover panel 152. That is, the front tether 110 is indirectly connected to the front surface 106 via the cover panel 152.

A stitch portion 152e of the cover panel 152 to be stitched to the front tether 110 is disposed at the intermediate portion between the opening 152a and the stitch portion 152d. Referring to FIG. 8, the stitch portion 152e is pulled toward the proximal end 101 closer than the stitch portion 152d under the tensional force of the front tether 110 in the capacity restricted state,. As a result, the region below (side of the proximal end 101) the opening 152a of the cover panel 152 is in the bent state.

In the capacity restricted state, the vent hole 151 and the opening 152a of the cover panel 152 are overlapped when viewed from the airbag 100 in the vehicle front direction. The vent 150 is opened.

Figure 9:
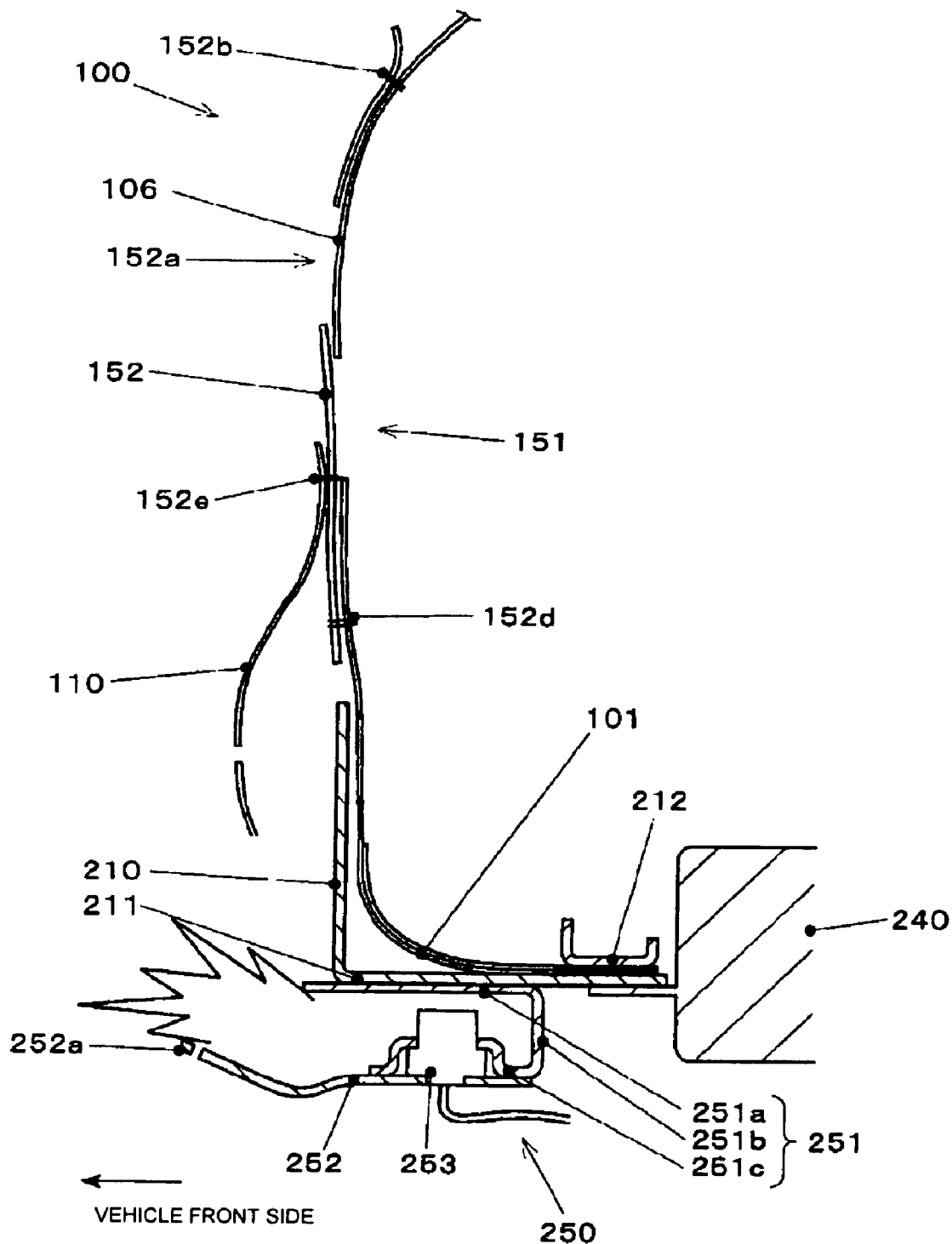
FIG. 9 is an enlarged sectional view showing the portion around the vent in the capacity restriction release state according to an exemplary embodiment.

FIG. 9 is a sectional view showing the portion around the vent 150 in the capacity restriction release state according to an exemplary embodiment. When the tether release unit 250 releases the front tether 110, the tear seam 152c breaks to extend the front surface 106 and the bent portion of the cover panel 152. As a result, the opening 152a of the cover panel 152 displaces upward relative to the vent hole 151 so as to be closed or sealed by the cover panel 152. That is, the distance between the retainer 210 and the bag ring 212 and the vent hole 151 is shorter than the distance between the retainer 210 and the bag ring 212 and the opening 152a of the cover panel 152.

In addition to the advantages of the first and the second exemplary embodiments, the third exemplary embodiment allows handling of the cover panel 152 to be easily performed during manufacturing of the airbag 100 because the cover panel 152 for forming the vent 150 is disposed outside the airbag 100. The airbag 100 can therefore be more easily manufactured.

The present invention is not limited to the exemplary embodiments described above, and the structure of the airbag device may be changed. For example, the structure of the base cloth panel for forming the airbag and combination thereof may be changed without being limited to the embodiments. The arrangement of the respective tethers and the number of those tethers are not limited. For example, three or more tethers or only one tether may be employed. When using plural tethers, all those tethers do not have to be used for releasing. Some of those tethers may be used for releasing.

The airbag device in each of the embodiments is a passenger airbag against the frontal collision. However, the present invention may be applied to the airbag device of various types, for example, the driver airbag, side airbag, knee airbag and the like.

In the respective embodiments, the seat sensor installed in the seat for detecting the load as the weight of the occupant is used to acquire the capacity set information based on which airbag state is selected from the capacity restricted state and the capacity restriction release state. However, the image of the occupant may be picked up for image processing to detect the physique of the occupant or the distance between the occupant and the interior member such as the instrument panel or to detect the longitudinal position of the seat. Alternatively, plural types of the aforementioned information data may be used. The acceleration caused by the impact detected by the acceleration sensor installed in the vehicle body may also be used as the capacity set information.

In the respective embodiments, the tethers are disposed to the front and the rear or left and right to the airbag. However, each position or the number of the tethers to be disposed is not limited. The vent may be formed in all the tethers, or in part of the plural tethers.

The priority application, Japanese Patent Application No. 2008-152892 filed Jun. 11, 2008, including the specification, drawings, claims and abstract, is incorporated herein by reference in its entirety.

Though the aforementioned embodiments has been described with regard to the arrangement of the airbag device to be installed in an automobile, the present invention may be adopted to occupant restraint systems to be installed in various vehicles such as an automobile, an airplane, a boat, a train, a bus, a truck, and the like.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag device comprising:
   an airbag comprising:
      a restraining portion for restraining an occupant,
      a proximal end located apart from the restraining portion, and
      a suction port through which deployment gas is introduced, the airbag being inflated by the deployment gas for deployment to the front of the occupant;
   a gas supply unit for supplying the deployment gas to the suction port;
   a tether disposed outside the airbag configured to allow an inner capacity of the airbag to be equal to or smaller than a predetermined value by restricting a distance between the proximal end and an outer surface of the airbag apart from the proximal end at deployment;
   a control unit configured to acquire capacity set information data that relates to at least one of a seat position on which the occupant is seated, a position of the occupant with respect to an instrument panel, a physique of the occupant, a weight of the occupant, and a magnitude of an impact caused by the collision;
   a tether release unit activated by the control unit configured to adjust configuration of the airbag by releasing an end portion of the tether at a side of the proximal end according to the capacity set information acquired by the control unit; and
   a vent that is configured to open in order to at least partially discharge the deployment gas from the airbag before activation of the tether release unit, wherein the vent is configured to close with the activation of the tether release unit to control discharge of the deployment gas from the airbag.

2. The airbag device according to claim 1, wherein the vent comprises:
   a vent hole formed in a surface of the airbag;
   a cover panel disposed in a region along an inner surface or an outer surface of the airbag to cover the vent hole, the cover panel forming an opening around the vent hole; and
   a vent sealing tether connected to the cover panel and pulled upon activation of the tether release unit,
   wherein the cover panel is fixed to the airbag before activation of the tether release unit and has a region opposite the vent sealing tether and bent by a breakable member, the opening located at a position overlapped with the vent hole to open the vent hole, and after activation of the tether release unit the breakable member is broken by inflation of the airbag to extend the bent portion, the opening being displaced from the vent hole and closing the vent hole.

3. The airbag device according to claim 2, wherein the cover panel is connected to an inner side surface of the airbag and the tether is connected to an outer side surface of the airbag, and wherein before activation of the tether release unit, the tether pulls the outer side surface of the airbag to bring the vent hole of the airbag and the opening of the cover panel into a substantially same position to discharge a large amount of the deployment gas to reduce the capacity and the configuration of the airbag.

4. The airbag device according to claim 2, wherein the cover panel is integrally formed with the vent sealing tether.

5. The airbag device according to claim 2, wherein after activation of the tether release unit and after complete deployment of the airbag, the tether is released so that a main panel of the pulled airbag is largely inflated,
   wherein the cover panel has one end fixed to the main panel of the airbag and the other end connected to the vent sealing tether, and
   wherein an end portion of the vent sealing tether opposite the cover panel is fixed to a vehicle body via to a fixing member to keep the cover panel at a constant distance from the fixing member in spite of movement of the tether.

6. The airbag device according to claim 5, wherein after activation of the tether release unit, a distance between a bottom surface of a retainer for fixing the airbag to the vehicle body and the vent hole of the airbag is longer than the distance between the bottom surface and the opening of the cover panel.

7. The airbag device according to claim 1, wherein the variable vent member comprises a vent hole formed in a surface of the airbag and a cover panel disposed in a region along an outer surface of the airbag to cover the vent hole and form an opening around the vent hole to which the tether is connected, and wherein a breakable member of the cover panel holds a region of the vent hole in the outer surface of the airbag opposite the proximal end in a bent state before activation of the tether release unit, the cover panel being located at a position having the opening overlapped with the vent hole to open the vent hole, and after activation of the tether release unit the breakable member is broken under a tensional force exerted to the airbag to extend the bent portion to displace the opening from the vent hole to close the vent hole.

8. The airbag device according to claim 7, wherein before activation of the tether release unit, the opening formed in the cover panel and the vent hole of the airbag are located at a substantially same position and held with the breakable member.

9. The airbag device according to claim 7, wherein after activation of the tether release unit, a distance between a fixing member for fixing the airbag to a vehicle body and the opening of the cover panel is longer than a distance between the fixing member and the vent hole of the airbag.

10. The airbag device according to claim 1, wherein at least one of a plurality of tethers is disposed from an outer lower side surface of the airbag to the tether release unit after deployment to pull the outer side surface of the airbag and change a configuration of the airbag by restricting the capacity of the airbag.

11. The airbag device according to claim 1, further comprising:

a retainer configured to store the airbag in a folded state before deployment, wherein the tether release unit is disposed outside the airbag.

* * * * *